(12) United States Patent
Wikander et al.

(10) Patent No.: US 9,785,143 B2
(45) Date of Patent: Oct. 10, 2017

(54) ELECTRONIC DEVICE HAVING A MOTION DETECTOR

(71) Applicant: INTEL CORPORATION, Santa Clara, CA (US)

(72) Inventors: Jered Wikander, Portland, OR (US); Mark MacDonald, Beaverton, OR (US); Menglu T. Jiang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/040,707

(22) Filed: Feb. 10, 2016

(65) Prior Publication Data
US 2016/0161943 A1 Jun. 9, 2016

Related U.S. Application Data

(63) Continuation of application No. 14/007,516, filed as application No. PCT/US2011/067889 on Dec. 29, 2011, now Pat. No. 9,261,878.

(51) Int. Cl.
*H02P 5/00* (2016.01)
*G05B 24/02* (2006.01)
*G06K 9/20* (2006.01)
*G06F 1/16* (2006.01)
*H04N 5/00* (2011.01)

(52) U.S. Cl.
CPC .......... *G05B 24/02* (2013.01); *G06F 1/1601* (2013.01); *G06F 1/166* (2013.01); *G06F 1/1681* (2013.01); *G06K 9/20* (2013.01); *H04N 5/00* (2013.01)

(58) Field of Classification Search
USPC ...... 318/3, 4, 7, 12, 15, 8, 115, 568.25, 625, 318/584; 361/379.06, 679.04, 679.21, 361/679.27, 679.05, 679.06; 248/183.2, 248/349.1; 345/8, 1.1
See application file for complete search history.

(56) References Cited

U.S. PATENT DOCUMENTS

| | | |
|---|---|---|
| 5,335,142 A | 8/1994 | Anderson |
| 5,345,362 A | 9/1994 | Winkler |
| 5,859,762 A * | 1/1999 | Clark ..................... F16M 11/10 248/122.1 |
| 5,904,328 A | 5/1999 | Leveridge et al. |
| 6,262,885 B1 | 7/2001 | Emma et al. |
| 6,430,038 B1 | 8/2002 | Helot et al. |

(Continued)

FOREIGN PATENT DOCUMENTS

| | | |
|---|---|---|
| JP | 2006-254028 A | 9/2006 |
| JP | 2008-219539 | 9/2008 |

(Continued)

OTHER PUBLICATIONS

International Search Report and Written Opinion dated Sep. 26, 2012 for corresponding Application No. PCT/US2011/067889.

(Continued)

*Primary Examiner* — Jorge L Carrasquillo
(74) *Attorney, Agent, or Firm* — Schwabe, Williamson & Wyatt, P.C.

(57) ABSTRACT

A computer is provided that includes a lid having a display and a motion detector to detect motion or movement of a user.

10 Claims, 5 Drawing Sheets

(56) References Cited

U.S. PATENT DOCUMENTS

| | | | |
|---|---|---|---|
| 7,758,005 B2* | 7/2010 | Uemura | H04N 5/64 248/130 |
| 2005/0270368 A1 | 12/2005 | Hashimoto | |
| 2007/0025853 A1* | 2/2007 | Chen | G06F 1/162 416/100 |
| 2008/0136658 A1 | 6/2008 | Brask | |
| 2008/0149800 A1* | 6/2008 | Katsumata | F16M 11/10 248/349.1 |
| 2009/0261223 A1* | 10/2009 | Nagaoka | F16M 11/08 248/349.1 |
| 2009/0319459 A1* | 12/2009 | Breazeal | G06K 9/00335 706/46 |
| 2011/0161710 A1 | 6/2011 | Huang et al. | |

FOREIGN PATENT DOCUMENTS

| | | |
|---|---|---|
| JP | 2008-219539 A | 9/2008 |
| JP | 2011-232474 | 11/2011 |
| KR | 10-0552055 B1 | 6/2006 |
| KR | 10-2007-0045006 A | 5/2007 |
| TW | I282435 | 6/2007 |
| WO | WO 2013/101087 A1 | 7/2013 |

OTHER PUBLICATIONS http://www.seeingmachines.com/product/faceapi/, downloaded from Internet on Jan. 10, 2014, originally viewed on Nov. 21, 2011, pp. 1-2.

http://techcrunch.com/2011/11/09/meet-swivl-the-motion-tracking-iphone-dock-that-always-keeps-you-on-camera/, downloaded from Internet on Jan. 10, 2014, listed as posted Nov. 9, 2011 by Greg Kumparak, pp. 1-7.

International Preliminary Report on Patentability and Written Opinion received for PCT Application No. PCT/US2011/067889, mailed on Jul. 10, 2014. 7 pages.

U.S. Office Action for U.S. Appl. No. 14/007,516 dated Apr. 28, 2015.

Taiwanese Office Action and Search Report for Application 101142634 dated May 5, 2015 and English language translation.

U.S. Notice of Allowance for U.S. Appl. No. 14/007,516 dated Jan. 27, 2016.

* cited by examiner

ELECTRONIC DEVICE HAVING A MOTION DETECTOR

CROSS-REFERENCE TO RELATED APPLICATIONS

This application is a Continuation Application of U.S. patent application Ser. No. 14/007,516, filed Sep. 25, 2013, which is a U.S. National Stage of PCT Application PCT/US2011/67889, filed Dec. 29, 2011, the subject matters of which are incorporated herein by reference.

BACKGROUND

1. Field

Embodiments may relate to an automatic articulating display of a computer or other electronic device.

2. Background

Computers have stationary displays that require manual adjustment by a user to obtain an optimal viewing angle. However, computer users are often moving about while viewing the display. A stationary display thus cannot adequately maintain the optimal viewing angle throughout the user's movement.

BRIEF DESCRIPTION OF THE DRAWINGS

Arrangements and embodiments may be described in detail with reference to the following drawings in which like reference numerals refer to like elements and wherein.

DETAILED DESCRIPTION

Arrangements and embodiments may be applicable to electronic devices such as laptop computers, tablets, mobile terminals (cellular phones) and/or televisions. For ease of description, the following will discuss computers (laptop and tablet), although the other electronic devices may also be used.

Figure 1:
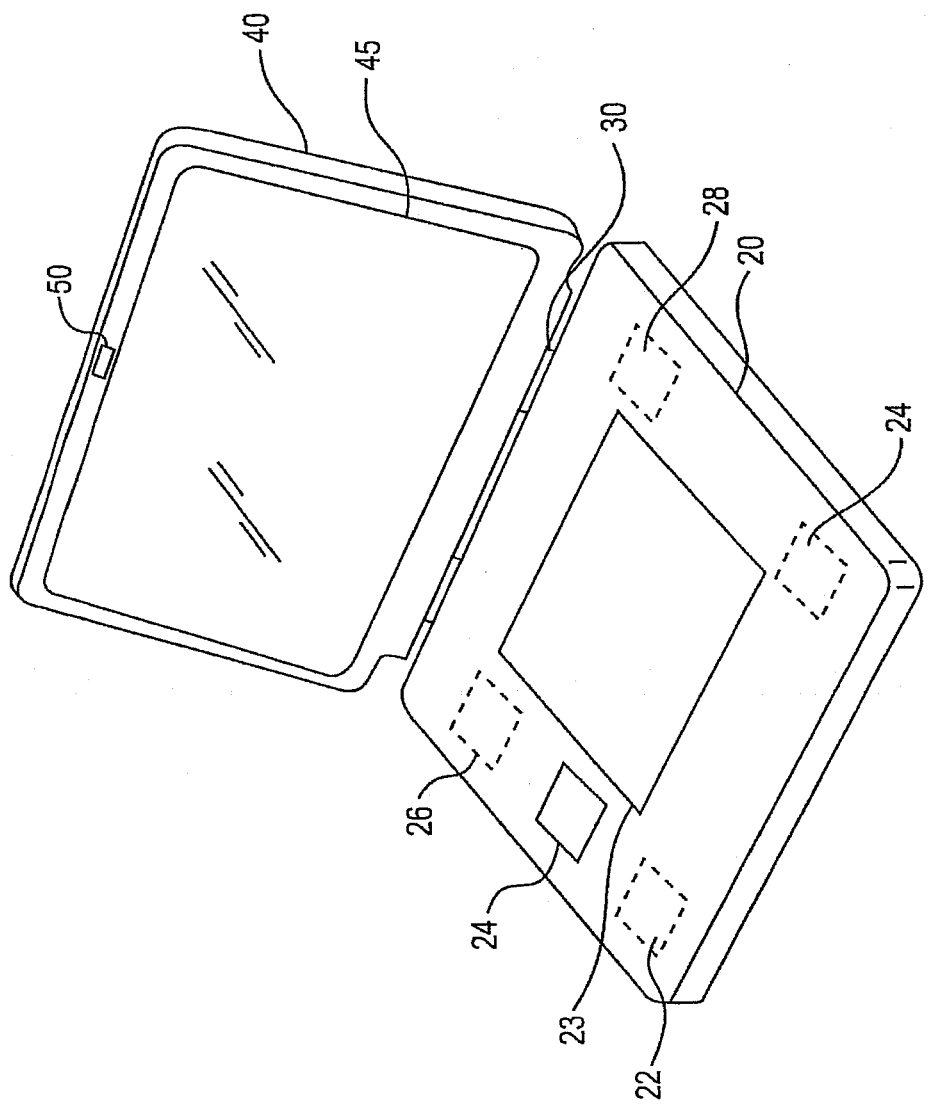
FIG. 1 shows a laptop computer according to an example embodiment.

FIG. 1 shows a laptop computer according to an example embodiment. Other arrangements and embodiments may also be provided.

More specifically, FIG. 1 shows a laptop computer 10 (or a notebook computer) that may include a base 10 and a lid 40 (or body portion) that are coupled together by a hinge device 30. FIG. 1 shows the computer 10 in an opened state (or opened position) in which the lid 40 is separated away from the base 20. The computer 10 may also be provided in a closed state (or closed position) when the lid 40 is closed to be adjacent to the base 20. The lid 40 may be considered a first body portion of the computer 10, and the base 20 may be considered a second body portion of the computer 10.

The base 20 of the computer 10 may support various components such as a processor 23, memory, a keyboard 21, a circuit board, etc. The lid 40 of the computer 20 may support a display 45 for a user to view during use of the computer 10. The lid 40 may also include a motion detector 50 (or tracking device or movement detecting device) to detect movement of a user. As one example, the motion detector 50 may be a webcam. The motion detector 50 may also be a sensor. Further, the motion detector 50 may be an infrared (IR) proximity sensor, a stereoscopic camera, an ultrasonic sensor, a depth camera, a RBG (red, blue, green) camera and/or a time-of-flight camera.

The motion detector 50 may detect, monitor or track movement of a user (relative to the display 45 or the lid 40). The detected movement of the user may be used to adjust (or move) at least the display 46 (or the computer 10). In one embodiment, the detected movement of the user may be used to adjust the lid 40 (having the display 45). The detected movement of the user may therefore control movement of the display 45 to correspond to movement of a user. This may enhance viewing by the user.

One method for controlling movement of the display 45 may be from feedback of a motion detector 50. This may also be accomplished or overridden with a remote and may be directly controlled by the user. One example may be when a user wants to momentarily share content with a bystander by rotating the display 45 to face someone who was originally outside of the viewing angle at the display 45.

The keyboard 21 may be provided on a first side (or top side) of the base 20. A motorized assembly (or moving device) may be provided in the base 20 (or at the base 20) to move the computer 10, such as moving at least the display 45. For example, a motorized assembly such as a plurality of motors and a plurality of wheels 22, 24, 26, 28 (or rollers) may be provided on a second side (or bottom side) of the base 20. In one example, the wheels 22, 24, 26, 28 may each be individually provided near a corresponding corner of the second side of the base 20. The wheels 22, 24, 26, 28 may be coupled to a motor (or a plurality of motors) that controls movement of the wheels 22, 24, 26, 28. The motors may be controlled by the processor 23 (or a controller) so that the wheels 22, 24, 26, 28 may roll, rotate and/or move in specific directions. Other devices may also be used to control movement.

The motion detector 50 may sense movement of a user by determining different locations (i.e., a first location and a second location) of a user over time. The movement may be movement of a location of a user's eye or a location of other facial features with regard to the computer 10, and more particularly movement with respect to the motion detector 50 or the display 45. The motion detector 50 may detect (or determine) movement of the user over time. This information may be used to control movement of the wheels 22, 24, 26, 28 (i.e., the motorized assembly or moving device) so the computer 10 moves such that the display 45 is aligned with the user (i.e., such as the user's eyes). In other words, the computer 10 may move such that the display 45 is substantially perpendicularly aligned with an eye sight of a user.

The wheels 22, 24, 26, 28 (or motorized assembly or moving device) may be driven by the corresponding motors such that the computer 10 (and more specifically the display 45) may spin (or move) in order to orient the computer 10 toward the user (who is moving about the computer 10).

The processor 23 and/or memory within the computer 10 may contain software (and/or data) that is used to identify specific features, such as a user's eye or other facial features. Information regarding a user that is received by the motion detector 50 may be analyzed by the processor 23 and may be used to detect, sense or track movement of the user. Based on the detected movement, the wheels 22, 24, 26, 28 (or motorized assembly or moving device) may be controlled by the processor 23 to move the computer 10 such that the display 45 is arranged substantially perpendicular to a line of sight of a user.

The processor 23 may be provided within the base 20, for example. The processor 23 may receive information from the motion detector 50 regarding the detected movement. The received information may be information of a first location of the user and information of a second location of the user. The received information may also be information regarding the detected movement. The processor 23 may also control the motorized assembly (i.e., the at least one of the wheels 22, 24, 26 and 28) based on the information received at the processor 23.

Figure 2:
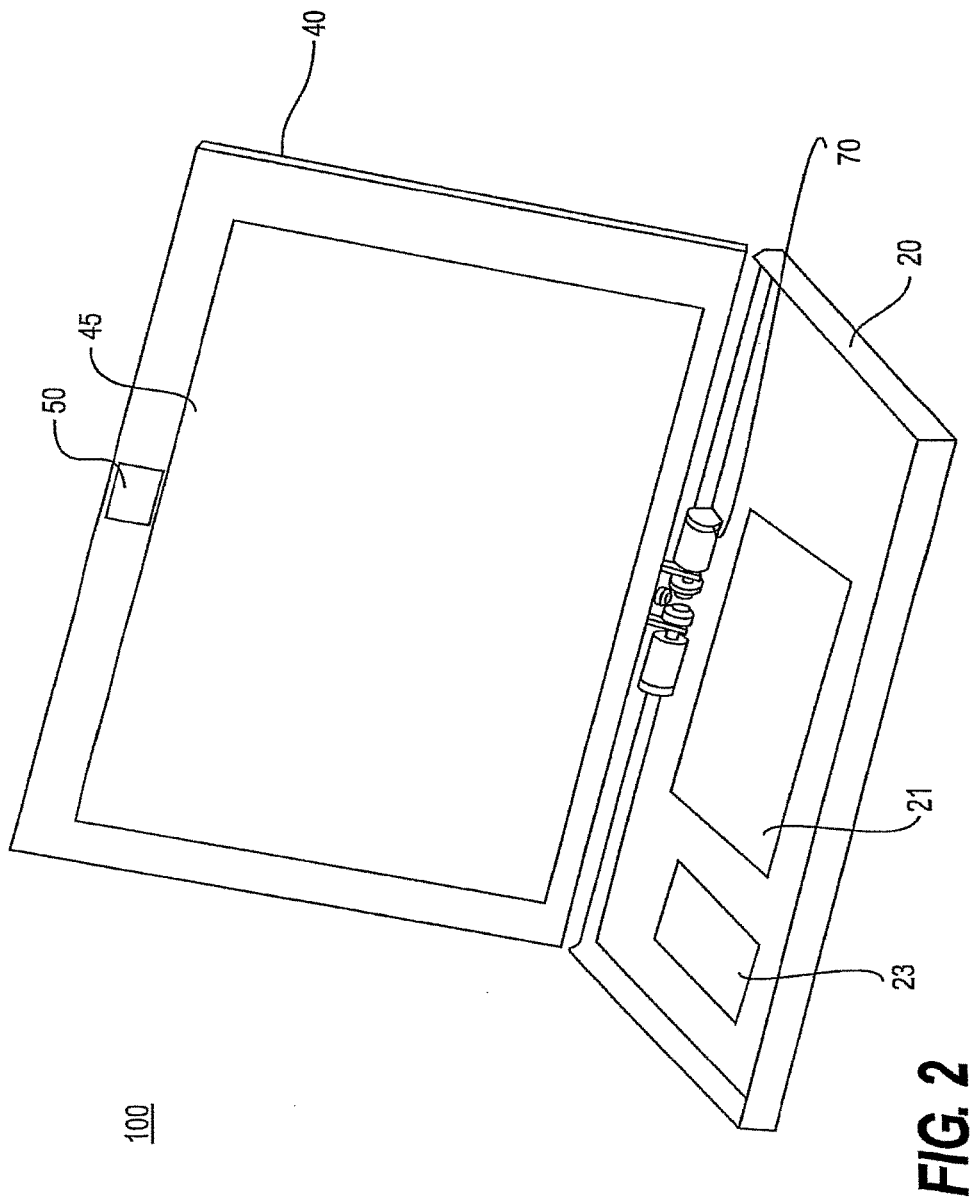
FIG. 2 shows a convertible notebook computer having a hinge assembly according to an example embodiment.

FIG. 2 shows a convertible notebook computer having a hinge assembly according to an example embodiment. Other embodiments and configurations may also be provided. The hinge assembly may be considered a moving device or a motorized assembly.

FIG. 2 shows a convertible notebook computer 100 (or convertible laptop) that may convert between a notebook mode and a tablet mode. Components of the computer 100 shown in FIG. 2 may correspond to components of the computer 10 shown in FIG. 1.

In the notebook mode, the base 20 and the lid 40 may be provided in an opened state (or opened position) such that the display 45 (on the lid 40) and the keyboard 21 (on the base 20) may be opened to a user in front of the computer 100. In the tablet mode, the base 20 and the lid 40 may be provided in a closed state (or closed position) such that the display 45 (on the lid 40) is facing upward and the keyboard 21 (of the base 20) is covered by the lid 40.

FIG. 2 also shows a hinge assembly 70 (or moving device) between the base 20 and the lid 40. The hinge assembly 70 may be an articulating hinge assembly. The hinge assembly 70 may allow movement of the lid 40 (or first body portion) relative to the base 20 (or second body portion). For example, the hinge assembly 70 may allow the lid 40 to move (or rotate) relative to the base 20 from the closed state to the opened state. The hinge assembly 70 may also allow the lid 40 to move/rotate from the notebook mode to the tablet mode. The hinge assembly 70 may allow a user to manually adjust the computer 100 between the different positions (i.e., the notebook mode and the tablet mode), or may allow a motor (or motors) to move/rotate the lid 40 relative to the base 20. The rotation by the motor (or motors) may be automatically performed.

FIG. 2 shows that the motion detector 50 may be provided on the lid 40 at an area above the display 45. The motion detector 50 may be provided at another area of the lid 40. The motion detector 50 may be one of a webcam, a sensor, an infrared proximity sensor, a stereoscopic camera, an ultrasonic sensor, a depth camera, an RGB camera and/or a time-of-flight camera.

The hinge assembly 70 may automatically operate based on movement information received from the motion detector 50 (or from a processor coupled to the motion detector 50). For example, the processor 23 may receive information from the motion detector 50 regarding the detected movement of the user. The processor 23 may also control the hinge assembly 70 (i.e., the motorized assembly or moving device) based on the information received at the processor 23.

The hinge assembly 70 may automatically adjust an orientation of the display 45 (based on information received from the motion detector 50) so that a user has a more direct view of the display 45. In the FIG. 2 embodiment, the hinge assembly 70 may adjust an angle of the lid 40 (or first body portion) to be more perpendicular to the user's line of sight. This may allow the user to have an optimal view of the display 45.

The hinge assembly 70 may be controlled (or driven) such that the computer 100 may spin (or move) in order to orient the display 45 (of the computer 100) toward the user (who is moving about the computer 100).

Software (and the processor 23) within the computer 100 may be used to identify specific features, such as a location of user's eye or a location of other facial features. Information from the motion detector 50 may be analyzed by the processor 23 and may be used to detect, sense or track movement. Based on the detected movement, the hinge assembly 70 may be controlled by the processor 23 to move the computer 100 such that the display 45 is arranged substantially perpendicular to a line of sight of a user.

In this example of the convertible laptop computer 100 (one that converts into a tablet mode) the hinge assembly 70 may rotate the lid 40 (or first body portion) about the base 20 (or second body portion) and fold the lid 40 onto the base 20. The hinge assembly 70 may include driving mechanisms that may be programmed to move based on the user's movements, and to maintain a line of sight (of the user) that is substantially perpendicular to the lid 40. Drive mechanisms used for the hinge assembly 70 (or moving device) may include servos, stepper motors, piezoelectric motors, geared linear solenoids and/or other miniature motors.

A gear system for the convertible laptop may be a differential gear assembly that is driven by two drive motors, for example. When the drive motors spin in a same direction, the display 45 may change pitch. On the other hand, when the drive motors spin in opposite directions, the display 45 (or the lid 40) may azimuthally rotate relative to the base 20. The movement of the display 45 may be based on movement detected by the motion detector 50.

Figure 3:
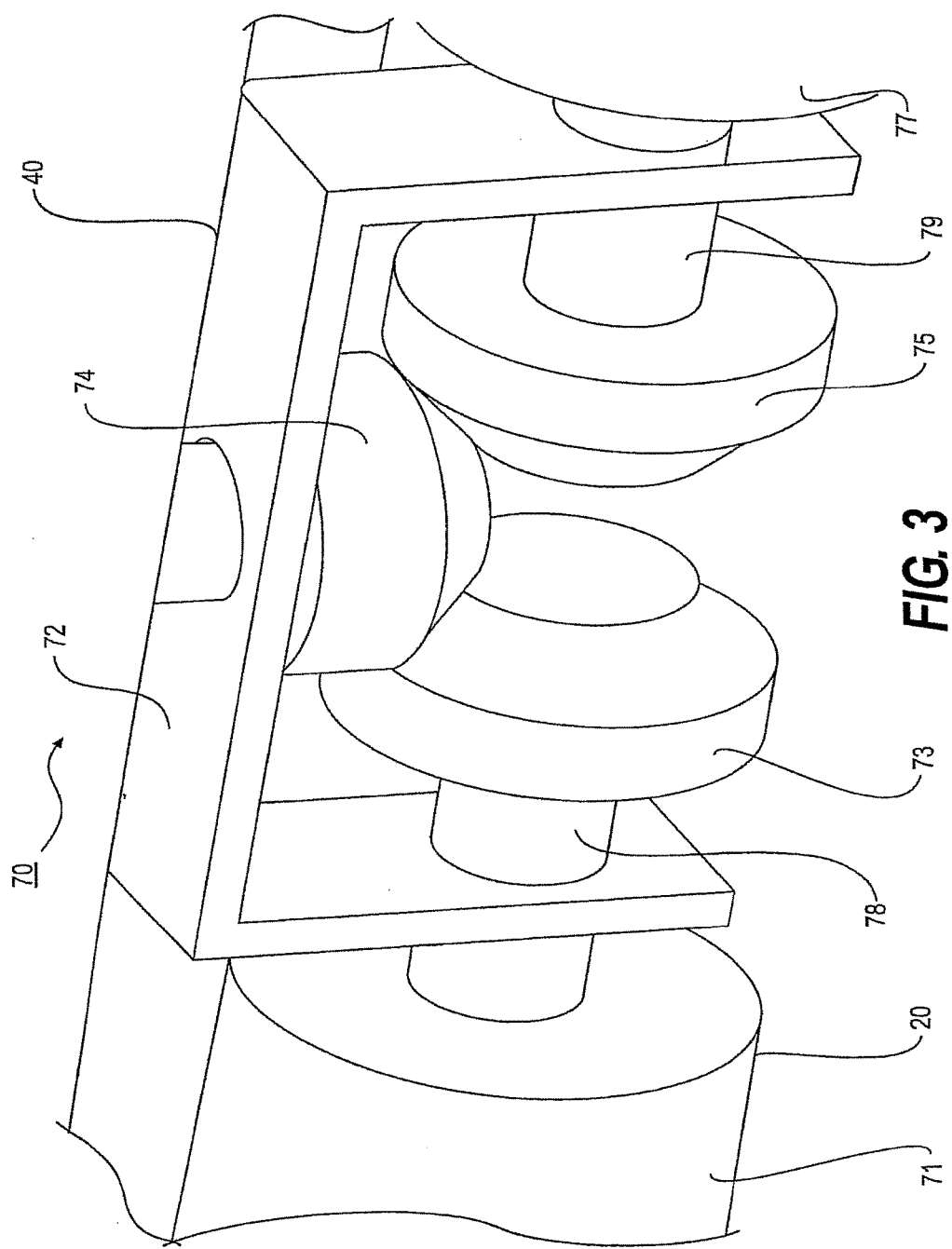
FIG. 3 shows a hinge assembly of a differential drive gear assembly according to an example embodiment of a differential drive gear assembly.
Figure 4:
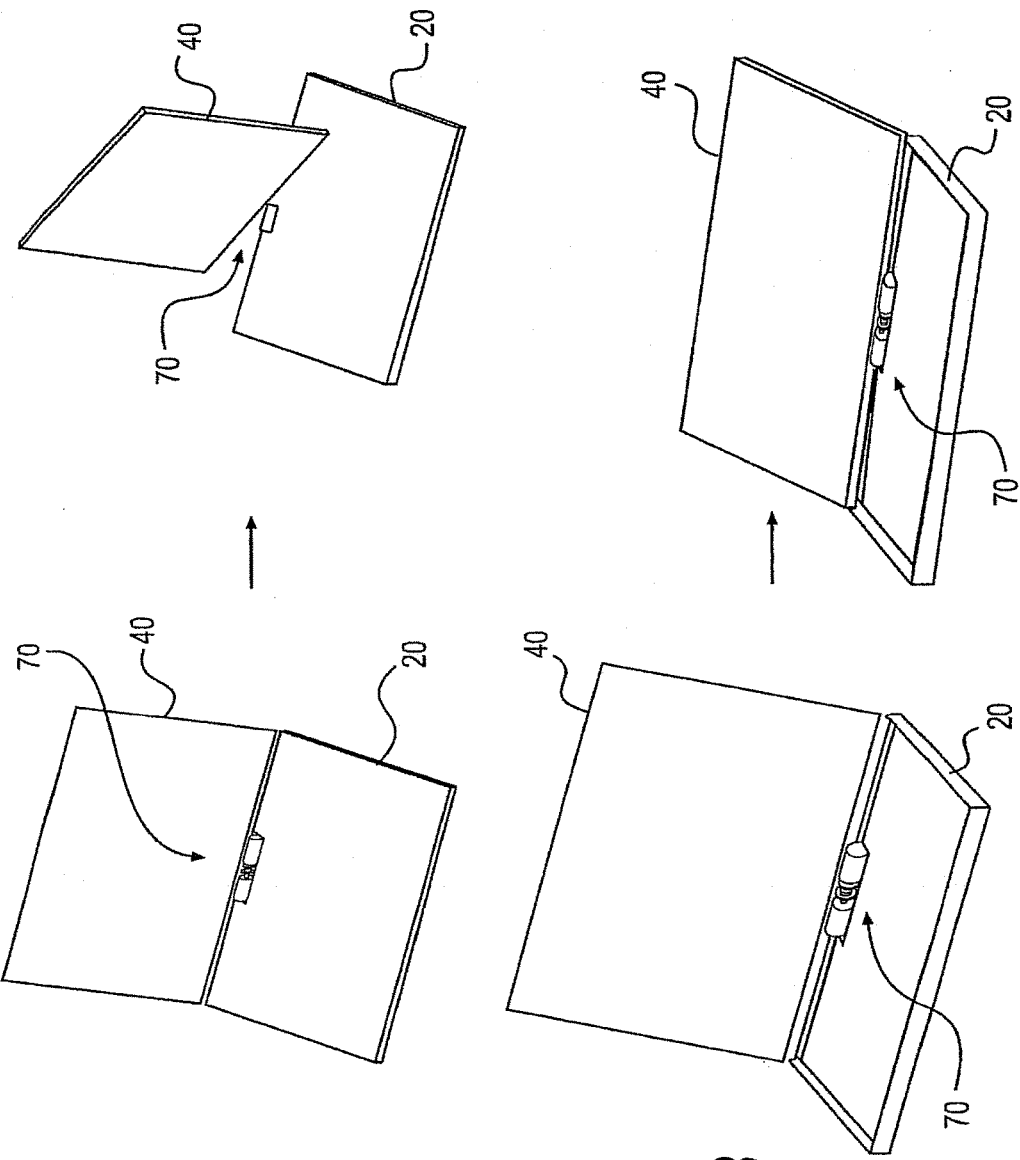
FIGS. 4A-4B show movement of a lid relative to a base by using the hinge assembly of FIG. 3.

FIG. 3 shows a hinge assembly according to an example embodiment of a differential drive gear. FIGS. 4A-4B show movement of the lid 40 (or first body portion) relative to the base 20 (or second body portion) by using the hinge assembly 70 of FIG. 3. Other embodiments and configurations may also be provided.

More specifically, FIG. 3 shows one example of the hinge assembly 70 (or motorized assembly). Other types of the hinge assembly 70 may also be provided. The hinge assembly 70 (or motorized assembly) may include a first motorized assembly (first motor and first drive gear) and a second motorized assembly (second motor and second drive gear). The hinge assembly 70 (or motorized assembly) may further include a third drive gear. The third drive gear may rotate based on a rotation from the first motorized assembly and a rotation from the second motorized assembly.

More specifically, the hinge assembly 70 (or motorized assembly) may include a first motor 71, a bracket 72, a first drive gear 73 (or first drive bevel gear), a third drive gear 74 (or third drive bevel gear), a second drive gear 75 (or second drive bevel gear) and a second motor 77. The bracket 72 holds the axis of rotation by having a bearing type of connection where drive shafts 78 and 79 are allowed to slip within holes of the bracket 72.

A first shaft 78 may extend outward from the first motor 71 (in a direction toward the second motor 77). The first drive gear 73 may be provided on the first shaft 78. Accordingly, the first drive gear 73 may be controlled based on a rotation of the first shaft 78 by the first motor 71. The first shaft 78 may slip within a hole of the bracket 72.

A second shaft 79 may extend outward from the second motor 77 (in a direction toward the first motor 71). The second drive gear 75 may be provided on the second shaft 79. Accordingly, the second drive gear 75 may be controlled based on a rotation of the second shaft 79 by the second motor 77. The second shaft 79 may slip within a hold of the bracket 72.

As shown in FIG. 3, the third drive gear 74 may be provided between the first drive gear 73 and the second drive gear 75. This may be considered a differential gear assembly.

The first motor 71 and the second motor 77 may be mounted to the base 20 (or may be provided within the base 20). The first drive gear 73 may be fixed or attached to the first shaft 78 and may be spun (or rotated) by the first motor 71. The second drive gear 75 may be fixed or attached to the second shaft 79 and may be spun (or rotated) by the second motor 77. The third drive gear 74 may be attached to the lid 40, and the third drive gear 74 may be driven by the first and second drive gears 73, 75.

During operation, when the first drive gear 73 rotates (or spins) in a first direction and the second drive gear 75 rotates (or spins) in a second direction opposite to the first direction, then the third drive gear 74 rotates (or spins) about its own axis and turns the lid 40. The lid 40 (and the display 45) thereby azimuthally rotates with respect to the base 20. For example, the lid 40 may be rotated up from the base 20 at a 90 degree angle with respect to the base 20 (and the base may be provided in a flat manner on a table). FIG. 4A shows the lid 40 (or first body portion) moving in a clockwise direction from a first position (aligned with the base 20) to a second position. This rotation is caused by the first drive gear 73 rotating in a different direction than the second drive gear 75, and thereby azimuthally rotating the third drive gear 74 in a clockwise manner.

On the other hand, when the first drive gear 73 rotates (or spins) in a first direction and the second drive gear 75 rotates (or spins) in the first direction (i.e., the same direction), then the third drive gear 74 does not rotate, but rather pushes on the bracket 72 and makes the lid 40 (or first body portion) pitch in a forward direction (based on the rotation direction of the first and second drive gears 73, 75). FIG. 4B shows the lid 40 to move in a rear direction from a first position (aligned with the base 20) to a second position. This movement (or rotation) is caused by the first drive gear 73 and the second drive gear 75 rotating in a same direction, and thereby pushing (or pitching) the bracket 72 and the lid 40 in a rearward manner.

When the first drive gear 73 rotates (or spins) in a second direction and the second drive gear 75 rotates (or spins) in the second direction (i.e., the same direction), then the third drive gear 74 does not rotate, but rather pulls on the bracket 72 and makes the lid 40 pitch in a rear direction (based on the rotation directions of the first and second drive gears 73, 75).

The hinge assembly 70 may move the lid 40 in an up direction or a down direction in response to the movement detected by the motion detector.

The hinge assembly 70 may move the lid 40 in a first side direction or in a second side direction in response to the movement detected by the motion detector.

The hinge assembly 70 may move the lid 40 in any direction in response to the movement detected by the motion detector.

Figure 5:
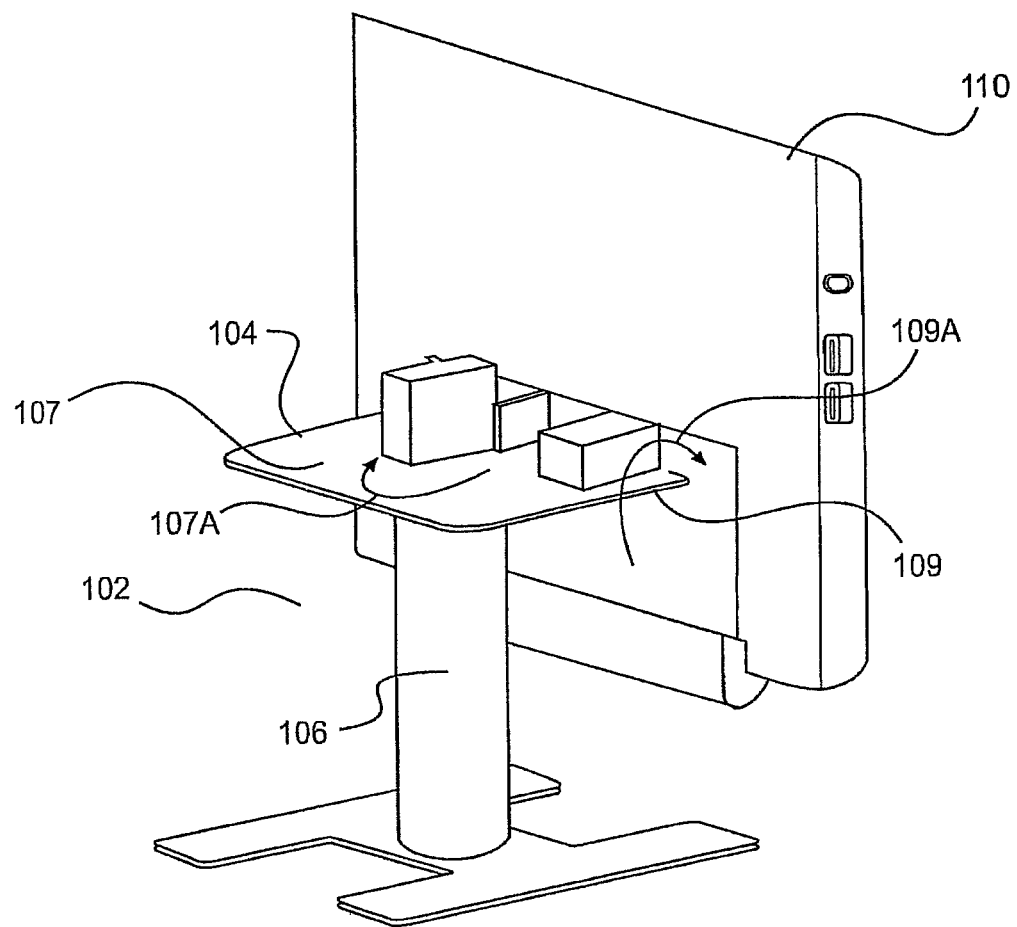
FIG. 5 shows a tablet computer and an articulating dock stand according to an example embodiment.

FIG. 5 shows an articulating tablet and tablet docking station according to an example embodiment. Other embodiments and configurations may also be provided. In this embodiment, a stand may be considered a base, and a tablet computer may include a body portion having a display.

More specifically, FIG. 5 shows a tablet computer 110 that is attached to a tablet stand 102 (or base). The tablet stand 102 may include a stand motorized assembly 104 (or moving device) that connects a vertical shaft 106 of the stand 102 with the tablet computer 110 (or body portion). The stand motorized assembly 104 (or moving device) may move the tablet computer 110 having a display 45 based on movement detected by the motion detector.

A first motor 107 and a second motor 109 may be provided on the stand motorized assembly 104 (or moving device) to control movement of the tablet computer 110 (or body portion) with respect to the stand motorized assembly 104 (or the vertical shaft 106 of the tablet stand 102).

The first motor 107 may rotate the stand motorized assembly 104 in a clockwise direction as shown by the arrow 107A, or may rotate the stand motorized assembly 104 in the opposite counterclockwise direction. This movement may be considered an azimuthal movement (in either a clockwise or counterclockwise direction).

The second motor 109 may rotate the stand motorized assembly 104 in a forward clockwise direction as shown by the arrow 109A, or may rotate the stand motorized assembly 104 in the opposite rearward counterclockwise direction. This movement may be considered a pitch movement.

The first and second motors 107 and 109 may be controlled based on information received from a motion detector. The motion detector may be provided on a front face of the tablet computer 110. The display 45 may also be provided on the front face of the tablet computer 110. The front face may be considered a first body portion of the tablet computer 110. As one example, the motion detector for the tablet computer may be similar to the motion detector 50 discussed above. However, the motion detector (for the tablet computer) may be different on the tablet computer than on the computer or the laptop.

The first and second motors 107 and 109 may operate in conjunction with the motion detector (and possibly a processor) to automatically adjust an orientation of the display 45 so that a user has a more direct view of the display 45. The first and second motors 107 and 109 may adjust an angle of the tablet computer 110 (or body portion) to be more perpendicular to the user's line of sight. This may allow the user to have an optimal view of the display 45.

Software (and the processor) within the tablet computer 110 (or provided on the stand motorized assembly 104) may be used to identify specific features such as location of a user's eye or location of other facial features. Information received by the motion detector may be analyzed by the processor and may be used to detect, sense or track movement. Based on the detected movement, the first and second motors 107, 109 (or moving device) may be controlled to move the computer 110 such that the display 45 is arranged substantially perpendicular to a line of sight of a user.

For example, the processor may receive information from the motion detector regarding the detected movement. The processor may also control the stand motorized assembly 104 (or moving device) based on information received at the processor.

In the above described embodiments, the motion detector 50 may be fully integrated into the computer.

Embodiments may also include an all-in-one type of computer. In this type of computer, movement control and electronics may be similar to the tablet computer, as discussed above. The body part supporting the display may be installed to a dock. The display may rotate continuously via a spinning electronic connection achieved with an existing slip ring style electrical connector.

Further, in an example where the eyes or face may not be in direct view of the display, and the user begins to move about, the motion detector may be able to still track the user. Further, in the presence of multiple users, the computer or device should have a priority algorithm to determine which face to track based on rules either pre-programmed into the controlling software or rules that are chosen by the user.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such a feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a stand having a vertical shaft, wherein the stand includes a moving device having a flat surface;
   a body portion having a display; and
   a motion detector to detect movement of at least one feature of a user's face,
   wherein the moving device is to move at least the display based on the movement detected by the motion detector, wherein a first motor and a second motor are provided on the flat surface of the moving device, wherein the flat surface of the moving device is connected to the vertical shaft of the stand, the first motor on the flat surface of the moving device to provide azimuthal movement of the body portion relative to the vertical shaft based on the movement detected by the motion detector by rotating the flat surface of the moving device, and the second motor on the flat surface of the moving device to provide pitch movement of the body portion relative to the vertical shaft based on the movement detected by the motion detector by rotating the flat surface of the moving device,
   wherein the azimuthal movement includes clockwise movement of the body portion and the flat surface relative to the vertical shaft, and counterclockwise movement of the body portion and the flat surface relative to the vertical shaft,
   wherein the pitch movement includes a forward clockwise movement of the body portion and the flat surface relative to the vertical shaft, and a rearward counter-clockwise movement of the body portion and the flat surface relative to the vertical shaft,
   wherein the motion detector is at a first surface of the body portion, and the moving device is at a second surface of the body portion, and
   wherein the first surface is a front surface of the body portion, and the second surface is a rear surface of the body portion.

2. The electronic device of claim 1, wherein the body portion is a tablet.

3. The electronic device of claim 2, wherein the stand includes a docking station of the tablet.

4. The electronic device of claim 1, wherein the body portion is a tablet computer.

5. The electronic device of claim 4, wherein the stand includes a base of the tablet computer.

6. The electronic device of claim 1, wherein the stand is an articulating docking stand.

7. The electronic device of claim 1, wherein the at least one feature of the user's face is a user's eye.

8. The electronic device of claim 1, wherein the motion detector includes one of a webcam, an infrared proximity sensor, stereoscopic cameras, an ultrasonic sensor or a depth camera.

9. The electronic device of claim 1, wherein the motion detector detects movement of a location of a user's eye.

10. The electronic device of claim 1, wherein the motion detector detects movement of a location of a facial feature of a user.

* * * * *